US011035712B2

(12) United States Patent
Yuan et al.

(10) Patent No.: US 11,035,712 B2
(45) Date of Patent: Jun. 15, 2021

(54) METERING SYSTEM FOR CALCULATING REAL-TIME PROFIT OR LOSS OF GAS STATIONS

(71) Applicant: Jiangyin Furen High-Tech Co., Ltd., Jiangsu (CN)

(72) Inventors: Junwei Yuan, Jiangsu (CN); Dongcheng Xu, Jiangsu (CN); Xiaodong Yin, Jiangsu (CN); Yang Fan, Jiangsu (CN); Lei Zhuang, Jiangsu (CN); Wenqing Wu, Jiangsu (CN)

(73) Assignee: Jiangyin Furen High-Tech Co., Ltd., Wuxi (CN)

( * ) Notice: Subject to any disclaimer, the term of this patent is extended or adjusted under 35 U.S.C. 154(b) by 0 days.

(21) Appl. No.: 16/851,727

(22) Filed: Apr. 17, 2020

(65) Prior Publication Data

US 2020/0387983 A1    Dec. 10, 2020

(30) Foreign Application Priority Data

Jun. 5, 2019    (CN) .......................... 201910484398.3

(51) Int. Cl.
*G01F 15/02*    (2006.01)
*B67D 7/22*    (2010.01)
(Continued)

(52) U.S. Cl.
CPC .............. *G01F 15/02* (2013.01); *B67D 7/222* (2013.01); *G06Q 30/0201* (2013.01); *G06Q 50/06* (2013.01)

(58) Field of Classification Search
CPC .... G06Q 50/06; G06Q 30/0201; B67D 7/222; G01F 15/02
(Continued)

(56) References Cited

U.S. PATENT DOCUMENTS 4,852,054 A * 7/1989 Mastandrea ........ G01F 23/0076
702/51
5,423,457 A    6/1995 Nicholas et al.
(Continued)

FOREIGN PATENT DOCUMENTS

CN    101533551 A    9/2009
CN    106527324 A    3/2017
(Continued)

OTHER PUBLICATIONS

Nang et al., "Fuel Monitoring and Electronics control of Dispenser for Fuel Station", International Journal of Engineering and Techniques—vol. 1 Issue 4, Jul.-Aug. 2015 (Year: 2015).*

*Primary Examiner* — Emmett K. Walsh

(57) ABSTRACT

The present application discloses a metering system for calculating a real-time profit or loss of a gas station, including a metering module, a level gauge of the oil tank, and a communication management machine with a built-in data processing module; the metering module and the level gauge are respectively communicated with the communication management machine; the oil tank, an oil pipeline of the oil tank and an oil inlet of the fuel dispenser are respectively provided with a sensor array module for collecting density data of the oil therein; the sensor array module includes a plurality of oil density sensors; the sensor array modules are communicated with the communication management machine; the built-in data processing module receives and processes data from the metering module, the level gauge and the sensor array modules respectively.

8 Claims, 2 Drawing Sheets

(51) Int. Cl.
*G06Q 30/02* (2012.01)
*G06Q 50/06* (2012.01)

(58) Field of Classification Search
USPC .......................................................... 705/7.35
See application file for complete search history.

(56) References Cited

U.S. PATENT DOCUMENTS

| | | | |
|---|---|---|---|
| 7,076,330 B1 * | 7/2006 | Dickson | B67D 7/085 |
| | | | 222/71 |
| 2009/0051554 A1 * | 2/2009 | Jarvie | G01M 3/2892 |
| | | | 340/622 |
| 2009/0164149 A1 * | 6/2009 | Harrell | G01F 25/0038 |
| | | | 702/50 |
| 2015/0153210 A1 * | 6/2015 | Bartlett | B67D 7/16 |
| | | | 141/95 |
| 2018/0037451 A1 * | 2/2018 | Johnson | G01F 1/007 |
| 2019/0016584 A1 * | 1/2019 | Londono Ortiz | B67D 7/84 |

FOREIGN PATENT DOCUMENTS

| | | | |
|---|---|---|---|
| CN | 108876015 A | 11/2018 | |
| CN | 208071299 U | 11/2018 | |
| CN | 109583812 A | 4/2019 | |
| JP | 2016126393 A | 7/2016 | |
| WO | WO-9202788 A1 * | 2/1992 | ............. G01F 15/02 |

* cited by examiner

METERING SYSTEM FOR CALCULATING REAL-TIME PROFIT OR LOSS OF GAS STATIONS

CROSS-REFERENCE TO RELATED APPLICATIONS

This application claims the benefit of priority from Chinese Patent Application No. 201910484398.3, filed on Jun. 5, 2019. The content of the aforementioned application, including any intervening amendments thereto, is incorporated herein by reference in its entirety.

TECHNICAL FIELD

The present application relates to metering technology for gas stations, more particularly to a metering system for calculating a real-time profit or loss of a gas station.

BACKGROUND OF THE INVENTION

Gas station usually employs liter as a statutory measurement unit of volume; while in the practical production and management, pricing usually takes ton as a statutory measurement unit of weight. However, the oil is greatly affected by temperature, causing a physical phenomenon of shrinkage or expansion. Therefore, an error exists between an oil output calculated by a metering module of a fuel dispenser and an oil reduction of an oil tank at the gas stations, thereby forming a profit or loss of refueling. For example, in winter, oil tanks and oil pipelines communicated with the fuel dispenser have a low temperature, causing the shrinkage of the oil, so that the oil output from the refueling gun has a heavier weight per unit volume, that is, oil with a greater weight is output, thus resulting in a loss on oil weight in the oil tank which is measured by weight. Conversely, in summer, the oil output from the refueling gun has a low density, resulting in a profit on the oil weight in the oil tank.

In order to manage the profit or loss of the oil weight in the oil tank and determine whether the profit or loss is normal, it is necessary to use certain technical means to accurately meter the real-time profit or loss of the gas stations.

There is a possible solution to overcome the above problem, where a density sensor is arranged in the gas tank to detect the density of the oil in the oil tank at regular intervals, and the detected density is compared with a theoretical density at respective temperatures, and then a density compensation is performed by manually checking the meter. However, the above method also has the following disadvantages.

Firstly, the density of the oil in the oil tank is detected at regular intervals, but the oil tank has a large size and is buried underground, so that the oil in the oil tank has small changes in temperature. However, the temperature of the oil in the oil pipelines is different from the temperature of the oil in the oil tank, so the density of the oil in the oil tank is not equal to an actual density at the refueling gun during a refueling process.

Secondly, since the oil pipelines of gas stations are generally not buried deep, the temperature of the oil pipelines is basically the same with a surface temperature, so that a temperature difference between day and night has a great impact on the oil pipeline.

Thirdly, in this method, an actual oil density of the refueling dispenser is corrected by comparing the density of the oil in the oil tank measured at regular intervals with the theoretical density at respective temperatures, and this method however has a low accuracy.

SUMMARY OF THE INVENTION

In order to solve the above problems, the present invention proposes a metering system for calculating a real-time profit or loss of a gas station, which aims to accurately meter the real-time profit or loss of the gas station, so that alarms are sounded in real time for fuel dispensers under abnormal conditions, thereby improving promptness of maintenance for equipment in the gas station. The specific technical solution is as follows:

a metering system for calculating a real-time profit or loss of a gas station, comprising:

a metering module which is provided on a fuel dispenser and is configured to meter a volume of oil output by a refueling gun in real time;

a level gauge which is provided on an oil tank and is configured to meter an amount of oil in the oil tank; and a communication management machine of the fuel dispenser with a built-in data processing module;

wherein the metering module and the level gauge are respectively communicated with the communication management machine; the oil tank, an oil pipeline of the oil tank and an oil inlet of the fuel dispenser each are provided with a sensor array module for collecting density data of the oil therein; the sensor array module comprises a plurality of oil density sensors; the sensor array modules are communicated with the communication management machine; the built-in data processing module receives and processes data from the metering module, the level gauge and the sensor array modules respectively; wherein the step of processing data comprises:

(1) calculating a total weight of the oil stored in the oil pipeline and the oil tank;

(2) calculating a reduction in the total weight of the oil in the oil tank for each refueling by the refueling gun;

(3) calculating an oil output weight corresponding to a volume of the oil output for each refueling by the refueling gun; and (4) calculating a difference between the reduction in the total weight of the oil and the oil output weight, to obtain a real-time profit or loss of single refueling.

In the above technical solution, current oil density data are collected in real time at the oil inlet of the fuel dispenser and a tank area (comprising the oil tank and the oil pipeline), and three collection arrays are respectively formed in the oil tank, the oil pipeline, and the oil inlet of the fuel dispenser. Since the oil density sensors are arranged in an array structure, many data points are collected, thereby improving a calculation accuracy of the profit or loss of the gas station when different positions in the tank area have different temperatures.

In addition, the metering system for calculating the real-time profit or loss of the gas station of the present invention binds with each transaction data of the fuel dispenser, in which the density data of the oil are collected from the lifting to the hanging of the refueling gun, thereby achieving a high data accuracy.

Moreover, the profit or loss of the oil is calculated based on the actual profit or loss of each refueling gun, thereby improving the data accuracy of the gas station.

Preferably, the step of processing data further comprises:

(1) calculating a cumulative value of the reduction in the total weight of the oil in the oil tank for multiple refueling within a period of time;

(2) calculating a cumulative value of the oil output weight corresponding to the volume of the oil output by the refueling gun within the period of time; and (3) calculating a difference between the cumulative value of the reduction in the total weight of the oil and the cumulative value of the oil output weight to obtain a periodic profit or loss.

As a further improvement of the present invention, a threshold is respectively set for the real-time profit or loss of the single refueling and the periodic profit or loss at the built-in data processing module of the communication management machine; the built-in data processing module issues an alarm when the threshold is exceeded.

Preferably, the step of issuing the alarm comprises displaying an alarm information on a display screen of the communication management machine.

As a further improvement, the metering system for calculating the real-time profit or loss of the gas station of the present invention further comprises a cloud data center and a management system which are networked with a plurality of communication management machines of a plurality of gas stations; wherein the communication management machines upload information to the cloud data center, and the management system processes the information and transmits the processed information to the communication management machines of the gas stations.

Preferably, the management system analyzes abnormal situations of the fuel dispensers based on the information uploaded by the communication management machines of the fuel dispensers, and issues an alarm to abnormal fuel dispensers.

The metering system for calculating the real-time profit or loss of the gas station further adopts a big data analysis technology; wherein by calculating and analyzing the real-time profit or loss of gas station uploaded to the cloud data center, a real-time alarm is issued for abnormal fuel dispensers and abnormal refueling guns; the metering system performs data linkage with the management system to timely investigate a root cause of problems.

Preferably, the metering module and the sensor array modules are respectively communicated with the communication management machine via an RS485 communication interface.

Preferably, the data of the real-time profit or loss of the single refueling and the periodic profit or loss are formed into a trend chart or a report (such as a statistical report or a comparative report), and displays on a computer screen of the communication management machines or the management system.

Preferably, a safety barrier is set between the communication management machine and each of the sensor array modules.

The present invention has the following beneficial effects.

Firstly, the metering system for calculating the real-time profit or loss of the gas station of the present invention, collects the current oil density in real time at the oil inlet of the fuel dispenser and the tank area (comprising the oil tank and the oil pipeline), so that three collection arrays are formed in the tank, the oil pipeline, and the oil inlet of the fuel dispenser. Since the oil density sensors are arranged in an array structure, many data points are collected, thereby improving a calculation accuracy of the profit or loss of the gas station when different positions in the tank area have different temperatures.

Secondly, the metering system for calculating the real-time profit or loss of the gas station of the present invention also binds with each transaction data of the fuel dispenser, in which the oil density data are collected from the lifting to the hanging of the refueling gun, thereby achieving a high data accuracy.

Thirdly, the metering system for calculating the real-time profit or loss of the gas station of the present invention accurately calculates an actual profit or loss of each refueling gun, thereby improving a data accuracy of the gas station.

Fourthly, the metering system for calculating the real-time profit or loss of the gas station of the present invention adopts the big data analysis technology to calculate and analyze the real-time profit or loss of the gas station uploaded to the cloud data center, so that the alarm is sounded in real time for abnormal fuel dispensers and abnormal refueling guns; besides, the improved metering system performs data linkage with the management system to timely investigate a root cause of problems.

DETAILED DESCRIPTION OF EMBODIMENTS

The present invention will be further described below with reference to the accompanying drawings and embodiments. The following embodiment is only intended to more clearly illustrate the technical solution of the present invention, but not to limit the scope of the present invention.

Figure 1:
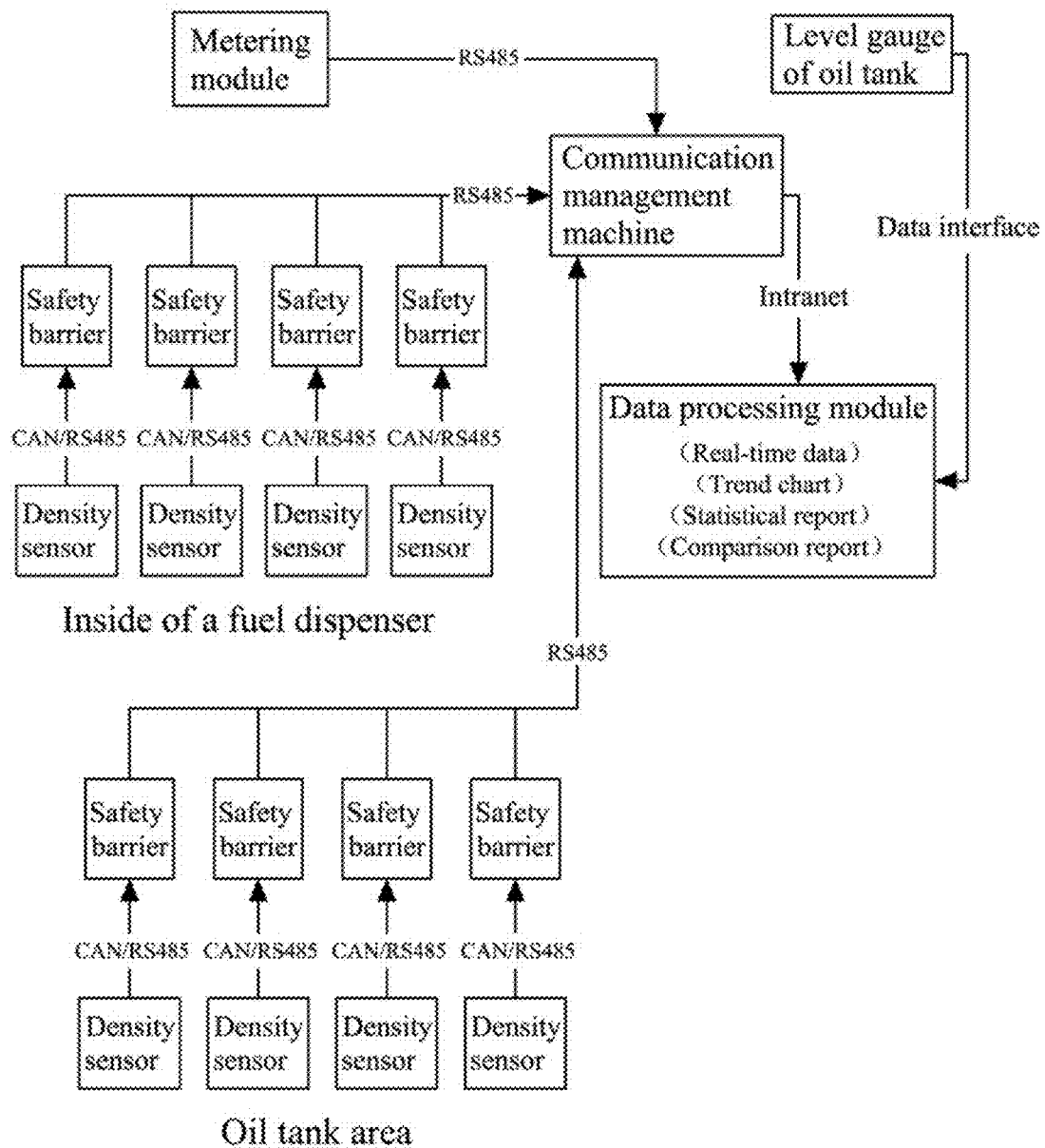
FIG. 1 is a schematic diagram of a metering system for calculating a real-time profit or loss of a gas station of the present invention.
Figure 2:
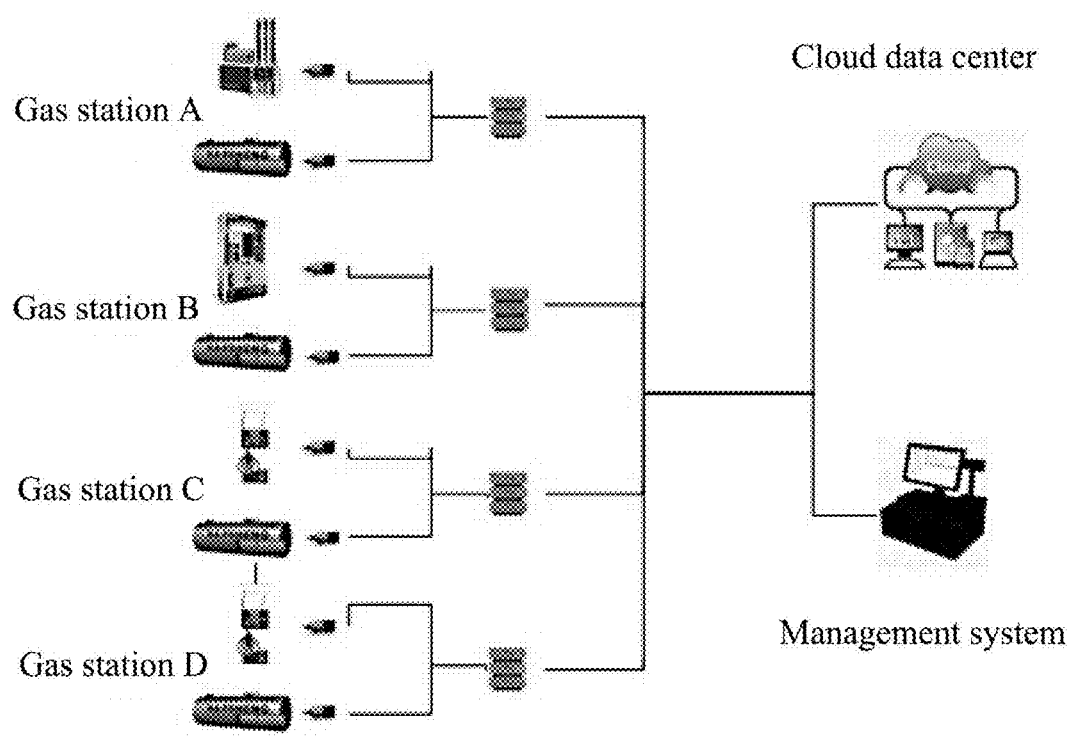
FIG. 2 is a schematic diagram of a management system of the gas station based on the metering system of FIG. 1.

Referring to FIGS. 1-2, this embodiment illustrates a metering system for calculating a real-time profit or loss of a gas station, including a metering module which is provided on a fuel dispenser and is configured to meter a volume of oil output by a refueling gun in real time, a level gauge of an oil tank which is provided on the oil tank and is configured to meter an amount of oil in the oil tank, and a communication management machine of the fuel dispenser with a built-in data processing module; the metering module and the level gauge are respectively communicated with the communication management machine; the oil tank, an oil pipeline of the oil tank and an oil inlet of the fuel dispenser each are provided with a sensor array module for collecting density data of the oil therein; where the sensor array module includes a plurality of oil density sensors; the sensor array modules are communicated with the communication management machine; the built-in data processing module receives and processes data from the metering module, the level gauge and the sensor array modules respectively; where the data is processed by the following steps:

(1) a total weight of the oil stored in the oil pipeline and the oil tank is calculated;

(2) a reduction in the total weight of the oil in the oil tank for each refueling by the refueling gun is calculated;

(3) an oil output weight corresponding to a volume of oil output for each refueling by the refueling gun is calculated; and (4) a difference between the reduction in the total weight of the oil and the oil output weight is calculated to obtain a real-time profit or loss of single refueling.

In the above technical solution, current oil density data is collected in real time at the oil inlet of the fuel dispenser and a tank area (including the oil tank and the oil pipeline), and three collection arrays are respectively formed in the oil tank, the oil pipeline, and the oil inlet of the fuel dispenser. Since the oil density sensors are arranged in an array structure, many data points are collected, thereby improving a calculation accuracy of the profit or loss of the oil when different positions in the tank area have different temperatures.

In addition, the metering system for calculating the real-time profit or loss of the gas station of the present invention binds with each transaction data of the fuel dispenser, in which the density data of the oil are collected from the lifting to the hanging of the refueling gun, thereby achieving a high data accuracy.

Moreover, the profit or loss of the oil is calculated based on the actual profit or loss of each refueling gun, thereby improving the data accuracy of the gas station.

Preferably, the data further processed by the following steps:

(1) a cumulative value of the reduction in the total weight of the oil for multiple refueling within a period of time is calculated;

(2) a cumulative value of the oil output weight corresponding to the volume of oil output by the refueling gun within the period of time is calculated; and (3) a difference between the cumulative value of the reduction in the total weight of the oil and the cumulative value of the oil output weight is calculated to obtain a periodic profit or loss.

As a further improvement of the present invention, a threshold is respectively set for the real-time profit or loss of the single refueling and the periodic profit or loss at the built-in data processing module of the communication management machine; the built-in data processing module issues an alarm when the threshold is exceeded.

Preferably, the step of issuing the alarm includes displaying an alarm information on a display screen of the communication management machine.

As a further improvement, the metering system for calculating the real-time profit or loss of the gas station further includes a cloud data center and a management system which are networked with a plurality of communication management machines of a plurality of gas stations; the communication management machines upload information to the cloud data center, and the management system processes the information and transmits the processed information to the communication management machines of the gas stations.

Preferably, the management system analyzes abnormal situations of the fuel dispensers based on the information uploaded by the communication management machines of the fuel dispensers, and issues an alarm to abnormal fuel dispensers.

The metering system for calculating the real-time profit or loss of the gas station further adopts a big data analysis technology; by calculating and analyzing the real-time profit or loss of the gas station uploaded to the cloud data center, a real-time alarm is issued for abnormal fuel dispensers and abnormal refueling guns; and the metering system performs data linkage with the management system to timely investigate a root cause of problems.

Preferably, the metering module and the sensor array modules are respectively communicated with the communication management machine via an RS485 communication interface.

Preferably, the data of the real-time profit or loss of the single refueling and the periodic profit and loss are formed into a trend chart or a report (such as a statistical report or a comparative report), and displays on a computer screen of the communication management machines or the management system.

Preferably, a safety barrier is set between the communication management machine and each of the sensor array modules.

The above is only a preferred embodiment of the present invention. It should be noted that all equivalent modifications or changes made by those ordinary skill without departing from the spirit and technical ideas of the present invention shall fall within the scope of the appended claims of the present invention.

What is claimed is:

1. A metering system for calculating a real-time profit or loss of a gas station to correct for a temperature factor, comprising:
   a metering module which is provided on a fuel dispenser and is configured to meter a volume of oil output by a refueling gun in real time;
   a level gauge which is provided on an oil tank and is configured to meter an amount of oil in the oil tank; and
   a communication management machine for the fuel dispenser with a built-in data processing module;
   wherein the metering module and the level gauge are respectively communicated with the communication management machine; the oil tank, an oil pipeline of the oil tank and an oil inlet of the fuel dispenser each are provided with a sensor array module for collecting density data of the oil therein; each sensor array module comprises a plurality of oil density sensors; the sensor array modules are communicated with the communication management machine; the built-in data processing module receives and processes data from the metering module, the level gauge and the sensor array modules respectively;
   wherein the step of processing data comprises:
   (1) calculating a total weight of the oil stored in the oil pipeline and the oil tank based on density data respectively detected by the sensor array modules at the oil tank and at the oil pipeline;
   (2) calculating a reduction in the total weight of the oil in the oil tank for each refueling by the refueling gun;
   (3) calculating, based on density data detected by the sensor array module at the oil inlet of the fuel dispenser, an oil output weight corresponding to a volume of the oil output for each refueling by the refueling gun; and
   (4) calculating a difference between the reduction in the total weight of the oil and the oil output weight, to obtain a real-time profit or loss of single refueling with correction for the temperature factor.

2. The metering system of claim 1, wherein the step of processing the data further comprises:
   (1) calculating a cumulative value of the reduction in the total weight of the oil for multiple refueling within a period of time;
   (2) calculating a cumulative value of the oil output weight corresponding to the volume of the oil output by the refueling gun within the period of time; and
   (3) calculating a difference between the cumulative value of the reduction in the total weight of the oil and the cumulative value of the oil output weight to obtain a periodic profit or loss.

3. The metering system of claim 2, wherein a threshold is respectively set for the real-time profit or loss of the single refueling and the periodic profit or loss; and the built-in data processing module issues an alarm when the threshold is exceeded.

4. The metering system of claim 3, wherein the step of issuing the alarm comprises displaying an alarm information on a display screen of the communication management machine.

5. The metering system of claim 4, further comprising a cloud data center and a management system which are networked with a plurality of communication management machines of a plurality of gas stations; wherein the communication management machines upload information to the cloud data center, and the management system processes the information and transmits the processed information to the communication management machines of the gas stations.

6. The metering system of claim 5, wherein the management system analyzes abnormal situations of fuel dispensers based on the information uploaded by the communication management machines of the fuel dispensers, and issues an alarm to abnormal fuel dispensers.

7. The metering system of claim 1, wherein the metering module and the sensor array modules are respectively communicated with the communication management machine via an RS485 communication interface.

8. The metering system of claim 1, wherein a safety barrier is set between the communication management machine and each of the sensor array modules.

* * * * *